Dec. 16, 1969  G. P. COLSON  3,484,136
ALIGNMENT METHOD AND APPARATUS FOR MOBILE STRUCTURE
Filed Dec. 8, 1967  3 Sheets-Sheet 1
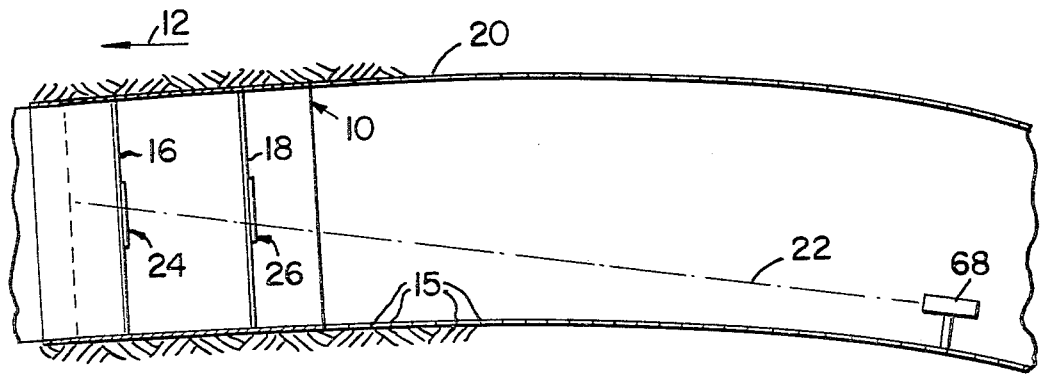
FIG_1
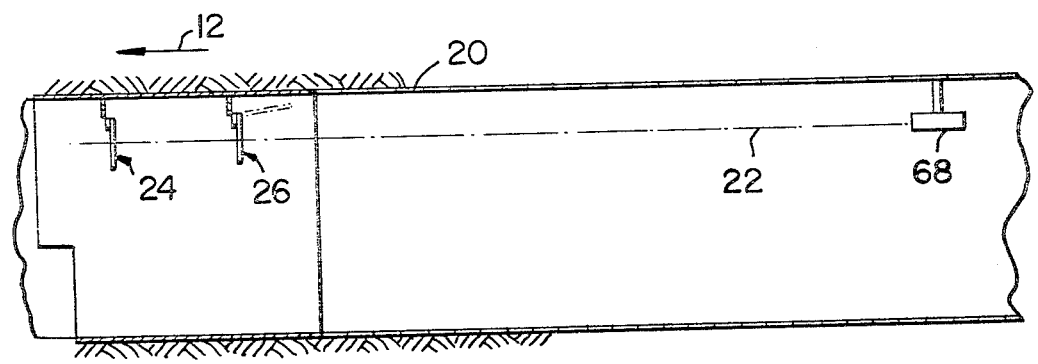
FIG_2
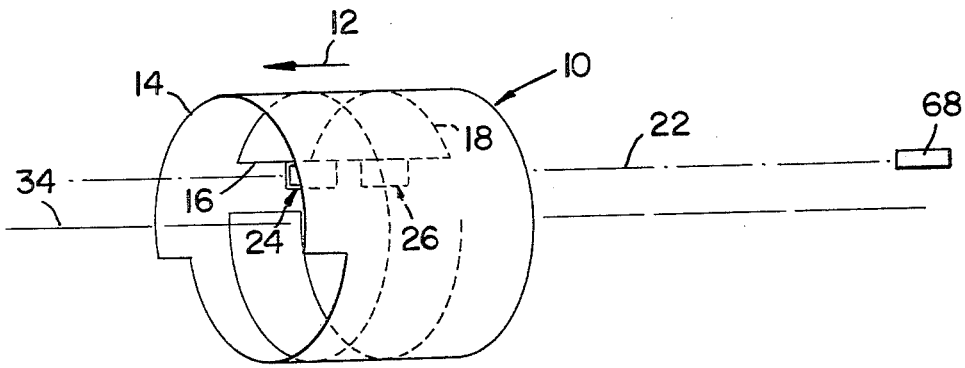
FIG_3
INVENTOR.
GEORGE P. COLSON
BY
Townsend and Townsend
ATTORNEYS

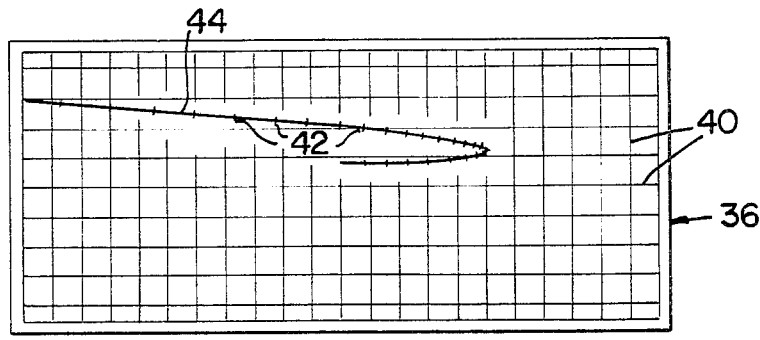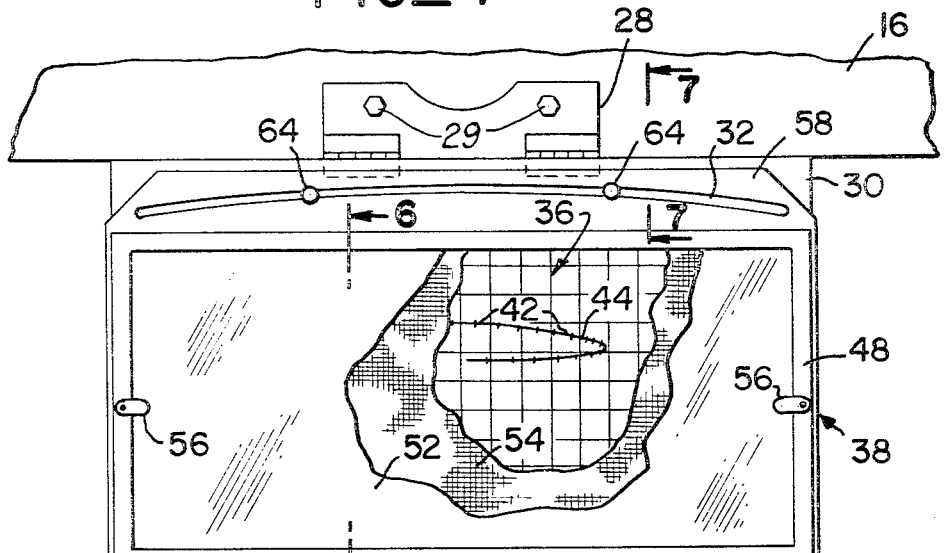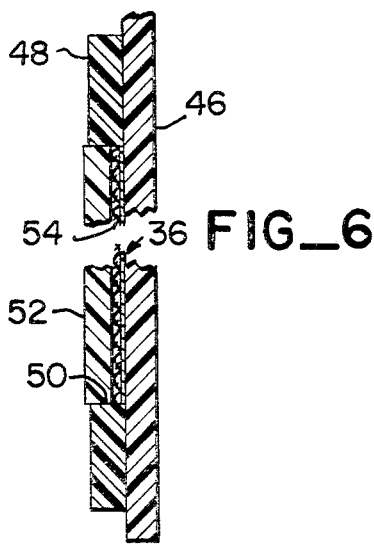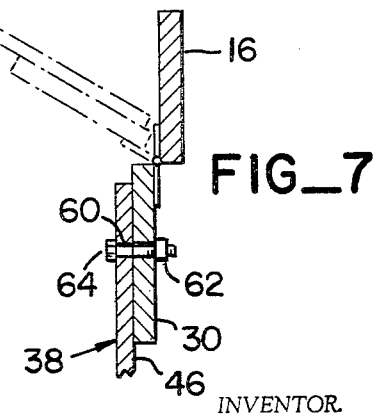

Dec. 16, 1969            G. P. COLSON            3,484,136
ALIGNMEMT METHOD AND APPARATUS FOR MOBILE STRUCTURE
Filed Dec. 8, 1967            3 Sheets-Sheet 3
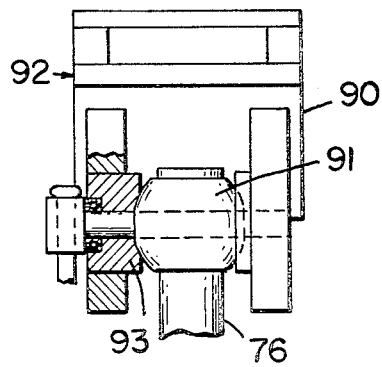
FIG_9
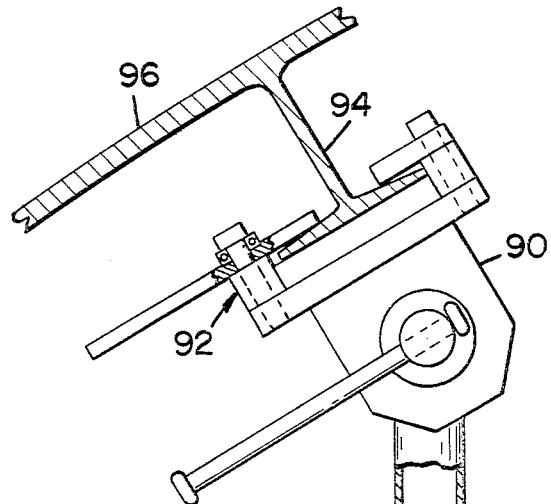
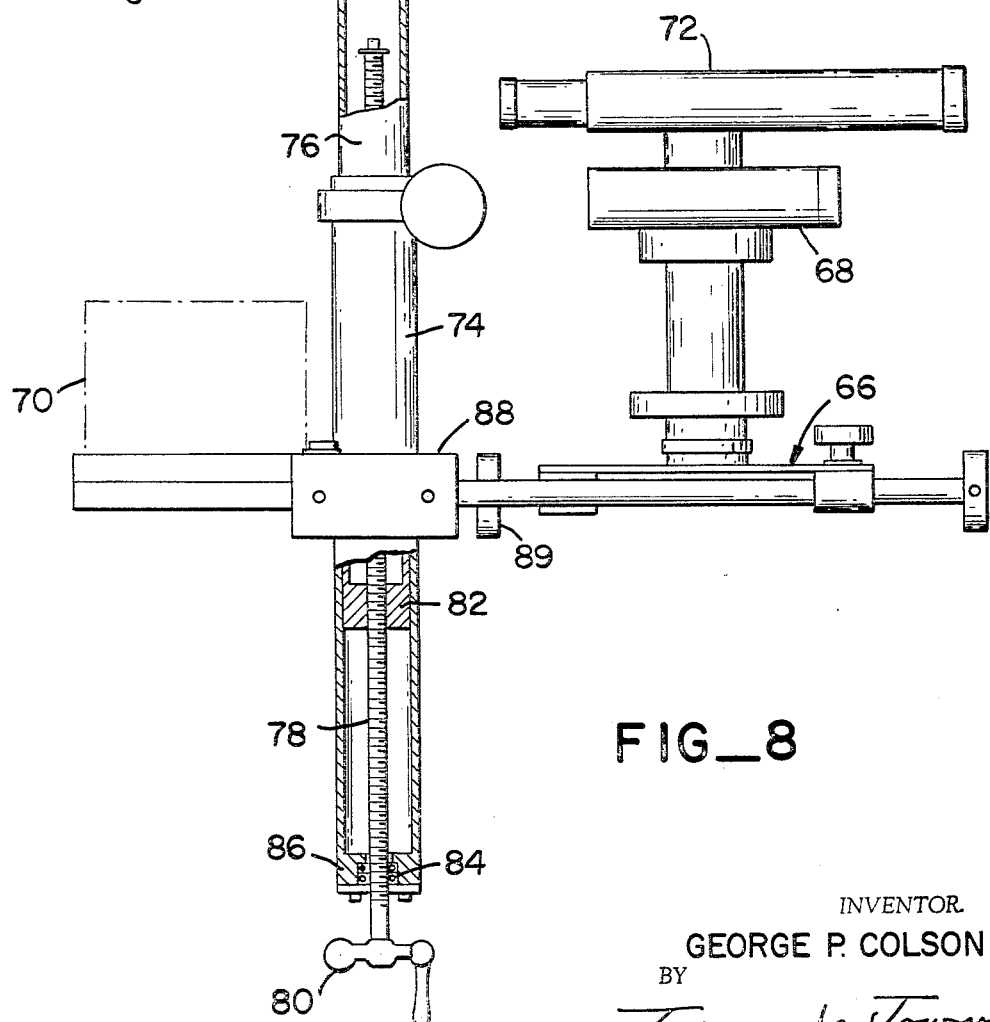
FIG_8
INVENTOR.
GEORGE P. COLSON
BY
*Townsend and Townsend*
ATTORNEYS

United States Patent Office 3,484,136
Patented Dec. 16, 1969

3,484,136
ALIGNMENT METHOD AND APPARATUS FOR MOBILE STRUCTURE
George P. Colson, Sonoma, Calif., assignor to Engineering Field Services, San Rafael, Calif., a corporation of California
Filed Dec. 8, 1967, Ser. No. 689,752
Int. Cl. E21d 19/02
U.S. Cl. 299—1
9 Claims

ABSTRACT OF THE DISCLOSURE

Method and apparatus for use in aligning a mobile structure with a pre-determined path to be traversed wherein a source of radiant energy placed at a reference position fixed with respect to the path provides a reference beam which passes through a pair of spaced targets mounted on and movable with the structure. Each target has a number of spaced index marks corresponding to respective stations along the path and defining the intersection points of the beam and target for proper alignment of the structure with the path. The beam is maintained as closely as possible to respective index marks during the advancement of the structure to assure that the structure will be properly aligned with the path. An improved target holder carried by the structure allows each target to be returned to an operative position relative to a fixed reference location on the path when the structure rolls about its longitudinal axis.

This invention relates to improvements in guidance systems for mobile equipment and, more particularly, to a method and apparatus for aligning a mobile structure, such as a tunnel-boring machine or the like, with a path to be traversed thereby.

The present invention is directed to a method and apparatus for use in maintaining a mobile structure in substantial alignment with a predetermined path wherein a beam of coherent radiation, such as a laser beam or the like, provides a reference line emanating from a reference position fixed realtive to the path and intersecting a pair of reference planes passing through the structure. A pair of targets are located in these reference planes and have spaced index marks thereon which are pre-calculated to provide the proper spatial coordinates for the intersections of the beam and the reference planes to assure that the structure is aligned with the path to be traversed. Thus, each index mark represents the intersection of the beam and a respective reference plane corresponding to a particular station or location along the path. By maneuvering the structure so that the beam and an index mark coincide, or nearly so, for a particular path station, the operator of the structure will known that the structure is, at that location, properly aligned with the path to be traversed. By continually monitoring the intersections of the beam on the targets throughout the entire path, the operator can observe the alignment at all times and can take corrective measures to bring the structure back into alignment when it deviates from the desired path.

The present invention, while being applicable to the alignment and guidance of different types of mobile structures, is especially adapted for use in tunnel boring operations wherein it is necessary to bore through the earth below the ground level along a path which deviates from a straight line. Such a path may have grade changes, changes laterally of a straight line reference, or a combination of grade and lateral changes. The usual practice is to advance the tunnel boring machine in increments and to line the tunnel wall immediately behind the machine with wall segments or rings. Thus, the operation of the machine is intermittent in that it is stopped while a ring is being put into place and is advanced to define the space for the next ring.

Heretofore, the usual way of maintaining the alignment of a tunnel boring machine is to rely upon conventional surveying techniques which require considerable equipment and effort on the part of several workmen. Also, these techniques must be used each time the machine is incrementally advanced. The amount of time and effort expended for machine alignment becomes considerable where a relatively long tunnel is to be bored and where a relatively large number of path changes must be made.

Generally, to align a tunnel boring machine using conventional techniques requires that a surveying team be at the job site at least during those times when the machine is to be advanced. Union practices usually prohibit workmen other than surveyors to do this type of work. During an eight-hour shift, the machine may be advanced only two or three times due to the amount of tunneling work involved during the time between the bringing of the machine to a halt after being advanced and before the next advancement. Thus, it is extremely impractical and costly to have a surveying team remain idle when the tunneling work is being done and while awaiting the time for advancing the machine once again. It is also inconvenient for a surveying team to come periodically to a job site to align the machine and then leave to continue with other work. Also, tunnel boring operations usually continue around the clock with substantially no interruption except for shift changes. Thus, surveying personnel must be present or available at all times to further add to the cost and inconvenience of using conventional alignment techniques.

The method of the present invention substantially eliminates the problems set forth above with respect to the usual way of aligning an earth boring machine. To this end, the method allows a tunnel boring machine to advance progressively over an extended stretch of a path to be traversed as the machine operator merely observes the intersections of a beam of radiation on a pair of spaced targets carried by the machine. By keeping the beam intersections as closely as possible to particular index marks on the targets, the operator can be assured that the machine is being advanced along the desired path. In this way, the machine operator alone provides for the alignment of the machine as the latter is advanced along a particular stretch of the tunnel and the only time when other personel are required is when the targets and the location of the beam source have to be changed. Since the targets may be provided with pre-calculated index marks corresponding to a tunnel stretch requiring at least several days to traverse, the additional personnel need only be present at relatively infrequent intervals and can, therefore, be available for other work.

A machine generally used for tunnel boring operations comprises a cylindrical shell which is advanced by a series of spaced hydraulic jacks engageable with the rear of the shell. Since the jacks are independently actuated, the shell oftentimes is subjected to forces which vary slightly in magnitude and this variation may cause the shell to roll about its longitudinal axis. Any roll of the shell will misalign the targets since the calculations for the index marks on the targets are based not only upon the reference planes in which the targets are disposed when mounted on the shell, but also upon the beam of radiation whose source is fixed relative to the path.

To avoid misalignment problems due to roll, the apparatus of the present invention has been provided wherein a target holder has means for returning the target to a fixed operative location relative to the path. To this end, the target holder is coupled to a bracket carried by the shell and the bracket has an arcuate slot concentric with the longitudinal axis of the shell. Thus, movement of the target holder relative to and along the slot will allow for compensation due to roll of the shell. A simple indicator, such as a plumb bob or the like, can be used to determine the proper location of the target holder.

The primary object of this invention is to provide a method and apparatus for use in aligning a mobile structure as the latter moves progressively along a pre-determined path wherein the operator of the structure can view the intersections of a beam of coherent radiation with a pair of spaced target members having index marks defining the spatial coordinates of the structure for particular stations along the path whereby the alignment of the structure with the path can be assured as the structure is advanced along a relatively long stretch of the path to thereby keep the structure in proper alignment with the path by maintaining the beam as closely as possible to the index marks.

A further object of this invention is to provide a method for aligning a tunnel boring machine which avoids the use of conventional surveying techniques heretofore relied upon for this purpose whereby the time and effort required to align such a machine is substantially minimized to thereby significantly reduce the cost of boring a tunnel.

A further object of this invention is to provide a method for use in aligning a tunnel boring machine wherein the spatial coordinates of the machine are pre-calculated and plotted on a pair of targets which, during use, are intersected by a beam of coherent radiation, whereby the operator of the machine, by observing the intersections of the beam relative to the plotted coordinates, can monitor the position of the machine relative to the path to be traversed as the machine is advanced along a relatively long stretch of the path and can determine whether corrective measures need to be taken to maneuver the machine into proper alignment with the path.

Still a further object of this invention is to provide a target holder for use in practicing the aforesaid method wherein the target holder has means for shifting the target about the longitudinal axis of the machine to thereby provide for the return of the target to its proper operative position when the machine rolls about its longitudinal axis.

Other objects of this invention will become apparent as the following specification advances, reference being had to the accompanying drawings for an illustration of the above apparatus and the manner in which the aforesaid method is carried out.

In the drawings:

FIG. 1 is a schematic view of a tunnel and tunnel boring machine alignable in accordance with the method of the present invention, the view being from above the tunnel;

FIG. 2 is a view similar to FIG. 1 but looking from the side of the tunnel;

FIG. 3 is a perspective view of the tunnel boring machine and the apparatus for carrying out the method of the present invention;

FIG. 4 is a side elevational view of a target member used with the present method;

FIG. 5 is a holder for the target of FIG. 4;

FIG. 6 is a cross-sectional view taken along line 6—6 of FIG. 5;

FIG. 7 is a cross-sectional view taken along line 7—7 of FIG. 5;

FIG. 8 is a side elevational view, partly in section, of a mount for the source of coherent radiation providing a reference beam for the practice of the present method; and FIG. 9 is a fragmentary and elevational view of a part of the mount of FIG. 8.

The method of the present invention is adapted for a number of different applications but, for purposes of illustration, it will be described hereinafter as being utilized in tunnel boring operations of the type which utilizes a generally cylindrical shell 10 (FIGS. 1–3) movable in the direction of the arrow 12 through the earth to form a tunnel broadly denoted by the numeral 20 in FIGS. 1 and 2. Shell 10 has a leading edge 14 which cuts through the earth and the shell is advanced forwardly under the action of a plurality of hydraulic jacks or similar structure which cause the shell to move incrementally in a forward direction. After each advancement, workmen positioned in the shell are able to remove the soil received in the shell as a result of the advancement.

Generally, the tunnel is lined with rings 15 which are placed in end-to-end relationship and form the inner wall of the tunnel itself. Each ring is placed individually in the tunnel after a corresponding advancement of the shell. The rings also can serve as a base against which the hydraulic jacks are engaged to advance the shell forwardly.

The shell is of the type having a pair of axially spaced diaphragms 16 and 18 which are generally perpendicular to the longitudinal axis 34 of the shell. These diaphragms serve to stabilize the shell against collapse from the surrounding earth. They also serve as reference planes for a pair of targets 24 and 26 carried by the diaphragms in depending relationship thereto. The targets are used in carrying out the method of the present invention and are used with a beam 22 of coherent radiation, such as a laser beam, in a manner to be described.

Each of the diaphragms 16 and 18 has a hinge member 28 secured thereto by bolt means 29 (FIG. 5) and the hinge member carries a swingable bracket 30 having an arcuate slot 32 therein. This slot is made so that it is substantially concentric with longitudinal axis 34 and the purpose of this feature is to allow shifting of the target holder 38 carried on bracket 30 to compensate for roll of shell 10. In this way, the target 36 carried by target holder 38 can be returned to a predetermined operative position at any time during the tunnel operations after it has been detected that the shell has rolled to any degree.

Each target member 36 may be of any desired construction except that the target member closest to the source of beam 22 is transparent to the beam so that the beam can advance and intersect the second target member. For purposes of illustration only, each target member 36 is comprised of a flexible sheet of transparent plastic of minimum thickness which can be configured in a planar condition when it is held by the corresponding target holder 38. Also, for purposes of illustration only, each target member 36 is provided with a number of intersecting grid lines which facilitate the plotting of the various index marks 42 thereon, which index marks are used to provide the coordinates of the beam during the tunnel boring operations.

Index marks 42 represent the points of interception of beam 22 on target member 36 for preselected locations or stations along the path. Thus, there is an index mark 42 for each target member corresponding to each of such stations. A curve 44 is used to interconnect the marks on each target member so that, as the shell traverses the desired path in a forward direction, the shell operator can view how the intersections of the beam move over the target members as the beam intersection point traverses from one index mark 42 to another. This feature may allow the operator to maneuver the shell or to cause it to deviate from the planned path segment if he sees that such action is necessary to bring the shell into proper alignment with the desired path.

Each target member 36 is mounted on its target holder 38 in the manner shown in FIGS. 5 and 6 wherein a backing plate 46 has a generally continuous border 48 mounted on one face thereof to define a recess denoted by the numeral 50 for receiving target member 36. A cover plate 52 having a light-gathering member 54 on the inner face thereof is received within recess 50, and rotatable arms 56 (FIG. 5) are mounted on border 48 for movement into overlying relationship to outer plate 52 whereby the latter is firmly held in recess 50 to, in turn, hold target member 36 in recess 50 in a generally planar condition.

Backing plate 46, cover plate 52, and light-gathering member 54 are transparent to beam 22. Member 54 is of a material for causing an observable spot to appear on or directly adjacent to target member 36, so that the shell operator can see the intersections of the beams and the target members. For purposes of illustration only, member 54 compirses a nylon mesh which is adhesively or otherwise attached to the inner surface of cover plate 52.

Backing plate 46 is provided with an upper extension 58 (FIG. 5) having a pair of shafts 60 thereon which are shiftably received in slot 32 as shown in FIGS. 5 and 7. Each shaft 60 comprises a threaded bolt having a nut 62 on the opposite end of the head 64 thereof, whereby target holder 38 may be releasably coupled to bracket 30 and held in a fixed position with respect thereto. Target holder 38 may be swung about the horizontal axis of the hinge 28 and into the dashed-line position (FIG. 7) permitting workmen to move about within the shell.

The structure for positioning the source 68 of beam 22 is illustrated in FIG. 8 and includes a platform 66 on which is mounted, in a suitable manner, beam source 68. For purposes of illustration, a laser beam is used to carry out the method of the invention and the laser source 68 is coupled to a suitable power supply 70 also carried on platform 66. An optical telescope 72 secured in any suitable manner to source 68, is disposed substantially parallel with the latter and is used for sighting on a suitable marker, such as one used in surveying work, whereby beam 22 can be oriented with respect to a predetermined reference point fixed relative to the path of travel of shell 10.

The mounting structure shown in FIG. 8 includes, in addition to platform 66, an outer tube 74 on which platform 66 is releasably secured. Tube 74 can be shifted relative to and longitudinally of a second tube 76 which is telescoped into tube 74. A threaded shaft 78 having a crank 80 on one end thereof is threaded into one end 82 of tube 76 and is coupled by a bearing 84 to the proximal end 86 of tube 74. By rotating screw 78, tube 74 can be caused to move with respect to and along tube 76 whereby platform 66 can be positioned at longitudinally spaced locations relative to tube 76. Also, a clamp 88 provided with a lock screw 89 (FIG. 9) releasably secured to tube 74 allows platform 66 to rotate relative to tube 74. The upper end of tube 76 has a ball 91 coupled to socket structure 93 mounted on bracket 90 which is secured by a second clamp 92 to suitable structure, such as a web 94 forming a part of a segment 96 of a wall-forming ring of the type mentioned above. While laser source mount (FIG. 8) is shown as depending from one of the ring segments, it is clear that the mounting structure could extend upwardly from a ring segment adjacent to the bottom of the tunnel.

In the practice of the invention, the path of travel oif the shell 10, i.e., the desired path along which the tunnel is to extend, is first selected and such factors as grade changes, and lateral deviations from a straight line are taken into consideration. Thus, the path will be established graphically or geometrically. As a second step of the method, the graphical tunnel is divided into discrete, end-to-end stretches and the length of each stretch will depend, of course, upon the curvature of the tunnel at various locations along the same. For purposes of illustration, the stretches may have, on the average, a length of approximately 25 feet. For each of these stretches, a pair of target members 36 will be provided so that after a particular stretch of the path has been traversed by the shell 10, the target members of the preceding path stretch will be replaced by target members corresponding to the next succeeding stretch.

With the foregoing preliminary steps completed, the next step in the practice of the method is to establish a predetermined reference position for beam 22. Source 68 will be placed at this reference position and the latter will be fixed relative to the path and will be the basis on which the calculations for index marks 42 are made. Such a reference may be a vertical line established by a plumb bob on the marker used with telescope 72.

By utilizing geometrical techniques and calculations, the various coordinates of the beam emanating from the reference position are computed for various stations along a respective stretch of the tunnel path. These calculations will be done, of course, for each of the target members, and the coordinates for one target member will normally be different from the other target member.

After computing the aforesaid coordinates, the same are plotted on the respective target members 36 and, if desired, curve 44 can be drawn to connect successive marks 42 together. The target members are then mounted on target holders 38 and these, in turn, are mounted on the diaphragms 16 and 18 of shell 10, which diaphragms initially establish the reference planes which pass through the shell and in which the target members are disposed during practice of the method.

The next step of the method is to align beam source 68 with respect to the predetermined reference fixed relative to the desired path and used for the alignment of source 68. This is done by sighting through telescope 72 onto a suitable marker, whereby the proper direction in which beam 22 is oriented is properly established. Since telescope 72 is parallel to source 68, the beam will be properly oriented as soon as telescope 72 is properly positioned relative to the marker.

When power supply 70 is energized, beam 22 is directed forwardly and through target members 36. The system is now ready for the forward advancement of shell 10, such advancement being effected by energizing the hydraulic jacks or other drive structure provided for this purpose.

During forward advancement of the shell, the shell operator can visually observe the light spots caused by the intersections of beam 22 on target members 36. In practice, no instantaneous changes in the forward advancement of shell 10 are generally made. What is actually done is that the operator initially decides how the hydraulic jacks are to be energized to maintain the intersections of the beam as closely as possible to the index marks. The aim, of course, is to keep the beam on each target member as closely as possible to the index marks for the various stations along the tunnel path. When this is achieved, the operator knows that the shell is properly oriented with respect to the path to be traversed. Any deviation from the path will ordinarily be slight and the operator can compensate for this by manipulating the various hydraulic jacks in different ways to return the shell to the proper position relative to the path to be traversed.

As the shell advances forwardly in increments, the operator can see at a glance the exact location of the shell with respect to the desired position on the tunnel path. As soon as the end of the stretch is reached, the next succeeding target members can be inserted in place as substitutes for the target members corresponding to the preceding stretch.

When changing target members, it may be necessary to reposition the mounting structure of source 68 (FIG. 8) at a new location or to orient the source differently at the same location. In either case, the aforesaid alignment techniques using the optical telescope will be utilized.

During the advancement of the shell, it is possible that the latter may roll about its longitudinal axis. This roll can be sensed by, for instance, a suitable plumb bob hanging from each of the diaphragms 16 and 18. When a roll of the shell occurs, the target members will also roll since they are connected to the shell. They can be returned to their operative positions rotating the same relative to brackets 30 so that shafts 60 move in and along slot 32. It will be necessary to first release the nuts holding shafts 60 in fixed positions relative to the slot. The nuts can be tightened after the new position is attained.

The aforesaid steps are repeated for the various stretches of the tunnel path until the tunnel is completely bored through.

An important feature of the invention lies in the fact that the operator, when viewing the positions of the intersections of the laser beam with the target members, can establish the curvature of the path of the tunnel to be traversed. This is important where the aforesaid rings which lie in the tunnel wall have to be tapered in order to compensate for grade changes and lateral deviations from a straight line. Such tapers are reflected in the width or axial length of the rings and, by viewing the way in which the curves 44 on target members 36 changes, the operator will know substantially what type of ring will be needed to fit the next void left by the incremental advancement of the shell. For instance, if the shell makes a slight descent, this means that the axial length of a corresponding ring will be less on the bottom than on the top part of the ring. Similarly, for a slight lateral deviation to the right, the axial length at the right-hand side of the ring will be slightly less than that of the left-hand side of the ring. Such taper or axial length change can be immediately perceived by observing the configuration of each curve 44 for a particular station along the tunnel path.

The method of the present invention provides for the extremely simplified alignment and guidance of shell 10 over extended stretches of a tunnel path without interruption from the practice of the alignment method itself. The method requires only the attention of a single operator once the shell begins to advance through the earth so that labor cost expended in aligning shell 10 are minimized. Also, the equipment expenditure is minmal since only a relatively few components are needed to carry out the teachings of the invention.

The target holder of this invention provides a simple and reliable structure for the quick return of the target members to their required operation positions if the shell rolls as it is advanced. This feature and advantage can be achieved even though the target holder is swingable out of the way in the shell to allow workmen to move about more freely within the shell.

While one embodiment of the method and apparatus of this invention has been shown and described, it will be apparent that other adaptations and modifications can be made without departing from the true spirit and scope of the invention.

What is claimed is:

1. A method for guiding an excavating machine along a previously designed direction of a stretch of tunnel, said machine carrying rear and front target holders disposed parallel to each other and transverse to the direction of travel of the machine, said holders being spaced apart a fixed amount measured in the direction of movement of said machine, said method comprising establishing a series of reference points to the rear of and along said stretch, said reference points being defined by horizontal and vertical coordinates and by distances along said stretch, plotting on a rear target to be installed in the rear holder using said coordinates the locus of a first point of a first series of points which is defined by the intersection with the rear target when the machine is pointed in proper direction at a first position in the course of excavation of said stretch of a first line directed in a preselected direction from a first of said reference points, plotting the loci of a plurality of additional points of said first series of points each defined by the intersection of said first line with said rear target when said machine has advanced along said stretch in said previously designed direction equi-distant positions from said first reference point, plotting for the front target the loci of a series of second points for the same plurality of equi-distant positions of the machine from the same first reference point relative to the intersection of the same straight line with said front target as said machine would advance along said designed stretch, mounting said rear and front targets in said rear and front holders, respectively, mounting a light beam source in said tunel at said first reference point with its beam directed in said straight line to intersect said targets, observing deviation of said beam from said loci, and correcting the direction of advance of said machine to bring said beam and loci into coincidence 2. The method of claim 1, in which said light beam source comprises a laser beam.

3. The method of claim 1, in which a first and second curve are drawn on the rear and front targets connecting and loci.

4. The method of claim 1, in which the portion of said machine on which said targets are mounted may roll about a longitudinal axis along the direction of movement of the machine which comprises shifting each said target in an arcuate path concentric with said axis to compensate for the amount of roll of said portion from original position.

5. An excavating machine guidance system comprising a shell, a rear target holder, first means for mounting said target holder relative to said shell transverse to the direction of movement of said machine, a forward target holder, second means for mounting said forward target holder relative to said shell parallel to said first holder and spaced forwardly thereof a predetermined distance, a rear target held in said rear holder having drawn thereon a first curve plotted between a first series of points, a forward target held in said forward holder having drawn thereon a second curve plotted between a second series of points, a light beam source, means mounting said source in a tunnel rearward of said shell having means for adjusting the position of said source relative to the horizontal and vertical and means to align said source with a reference point to direct a beam from said source along a predetermined line intersecting both said targets, said first and second curves displaced relative to each other by amounts which are functions of said fixed distance, the variable distances of said targets from said source as said shell advances in tunneling a stretch of tunnel, and the designed direction of said stretch of tunnel, whereby upon observation of the illumination of said targets relative to said curves the variation of said shell from the designed direction of the tunnel may be observed.

6. A system according to claim 5, in which said light beam source comprises a laser beam.

7. A system according to claim 5, in which further comprises a transparent light gathering member overlying each said target and held in the respective holder for said target.

8. A system according to claim 5, in which each of said first and second means comprises a bracket attached to ne of said holder, a support fixed to said shell and to said bracket, and hinge means connecting said holder to said bracket for pivoting said holder relative to said shell about a horizontal axis transverse to the direction of movement of said machine.

9. A system according to claim 5, in which said shell is capable of rolling about an axis at about the longitudinal center line of the machine which is parallel to the direction of movement of the machine and in which each of said first and second means comprises a bracket fixed to said shell extending transverse to said direction of movement and formed with an elongated arcuate slot concentric with said axis and adjustable means suspending said target holder from said bracket, said adjustable means passing through said slot to compensate the position of said holder for roll of said shell about said axis.

References Cited

UNITED STATES PATENTS 685,455 10/1901 Kinkead _____ 33—46.2

3,321,248 5/1967 Williamson et al. _____ 299—1

FOREIGN PATENTS 1,367,722 6/1964 France.

ERNEST R. PURSER, Primary Examiner

U.S. Cl. X.R.

33—46.2; 61—85